Dec. 9, 1969   W. W. H. CLARKE   3,482,453
ELECTRICAL ANALOGUE DECELERATION METER
Filed Jan. 16, 1967   2 Sheets-Sheet 1

INVENTOR
WALTER WILSON HUGH CLARKE
BY
ATTORNEYS

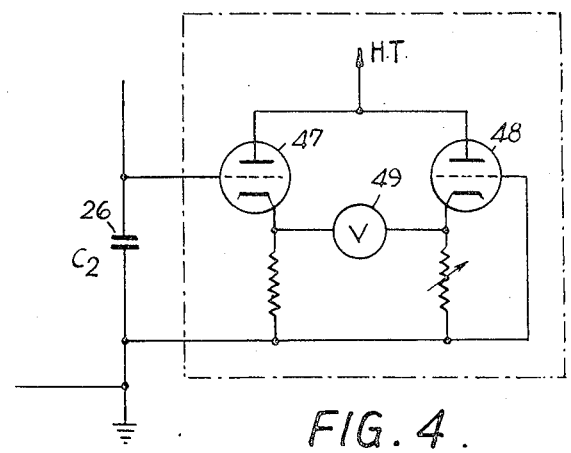
FIG. 4.
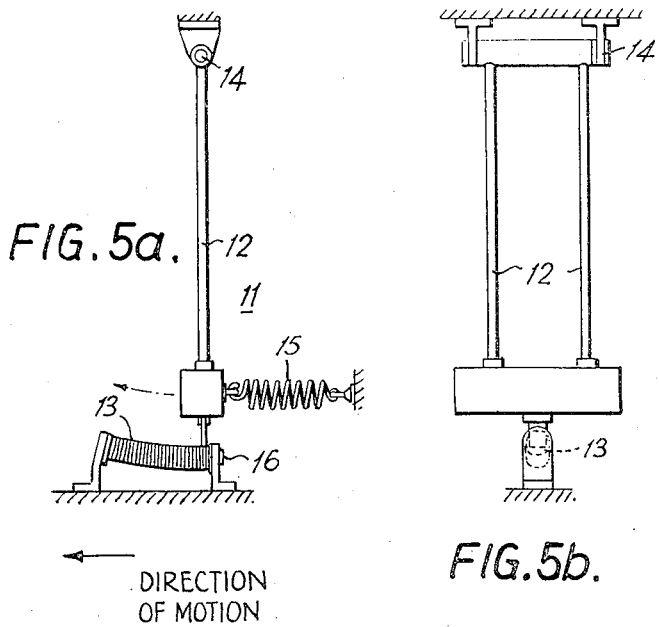
FIG. 5a.
DIRECTION OF MOTION
FIG. 5b.
INVENTOR
WALTER WILSON HUGH CLARKE
ATTORNEYS

United States Patent Office 3,482,453
Patented Dec. 9, 1969

3,482,453
ELECTRICAL ANALOGUE DECELERATION METER
Walter Wilson Hugh Clarke, Brookslands, Marsh Lane, Eversley, Hampshire, England
Filed Jan. 16, 1967, Ser. No. 609,515
Claims priority, application Great Britain, Jan. 19, 1966, 2,551/66
Int. Cl. G01p *15/00;* G01l *5/28*
U.S. Cl. 73—490                                11 Claims

ABSTRACT OF THE DISCLOSURE

In apparatus for measuring over-all deceleration during brake testing of a road vehicle, there is set up a voltage representing an analogue of the initial velocity of the vehicle. An electrical instantaneous decelerometer provides a voltage representing the instantaneous deceleration of the vehicle. The deceleration voltage is integrated and subtracted from the analogue initial velocity voltage to give a voltage representing an analogue of the instantaneous velocity of the vehicle. This last voltage is further integrated to provide an output voltage which is an analogue of the distance travelled by the vehicle and which provides a measure of the braking efficiency.

---

The present invention relates to apparatus for measuring average deceleration.

The apparatus relates in particular, but not exclusively, to the measurement of average deceleration of road vehicles during brake testing. Fundamentally the important criterion in such testing is the distance required by a vehicle to stop from a given speed. Because of the difficulty of measuring the true speed of the vehicle and in marking the position of application of the brakes, accurate measurement of braking distances cannot readily be made without special equipment. Consequently the maximum deceleration achieved during braking is often used as a criterion. Maximum reading decelerometers can give an indication of over-all brake performance only when the deceleration reaches its maximum rapidly and remains reasonably constant during braking. This condition usually applies to cars braking on dry roads but in the case of heavy commercial vehicles vibration, delay in brake operation, or slow build-up of braking effort can cause the mean deceleration to be lower, and sometimes considerably lower, than a peak recorded value would suggest. It will be appreciated that any delay between the depression of the brake pedal and the application of the brake has a particularly severe effect upon the over-all braking efficiency as at the time of delay the vehicle is proceeding at its initial speed with the result that the distance travelled is correspondingly great.

There is known a mechanical apparatus which provides a measurement of the distance travelled by a vehicle during the braking operation, and this apparatus operates by setting up an analogue of the velocity of the vehicle being tested and deriving an analogue of the distance travelled by the vehicle. In the known mechanical device a flywheel is propelled along a rack with an initial velocity related to the initial velocity of the vehicle, and the deceleration of the vehicle brings the fly-wheel to rest in a distance travelled along the rack which can be measured and which gives an analogue of the distance travelled by the vehicle. This analogue distance which is recorded, together with a knowledge of the initial velocity of the fly-wheel, is sufficient to provide a measure of the efficiency of the braking operation.

It is a disadvantage of such a mechanical brake testing apparatus that the device can only conveniently be calibrated or used with one analogue initial velocity. As the brake testing apparatus can only be used in a vehicle which is tested from a speed equal to or slightly greater than the analogue initial velocity for which the apparatus is calibrated, the use of the apparatus is limited to testing vehicle at a single speed.

According to the present invention there is provided apparatus for measuring average deceleration, the apparatus comprising an electrical instantaneous decelerometer for providing a first voltage representing instantaneous deceleration applied to the apparatus, a first electrical network for integrating the first voltage and subtracting the resultant from a second voltage representing an analogue initial velocity which is an analogue of the actual initial velocity of the apparatus, the electrical network providing in operation a third voltage representing an analogous instantaneous velocity which is an analogue of the actual instantaneous velocity of the apparatus, and a second electrical network for integrating the third voltage over the time interval for which the average deceleration is to be measured to provide a fourth voltage representing an analogue distance which is an analogue of the actual distance travelled by the apparatus during the said time interval and which analogue distance provides a measure of the average deceleration.

In one construction of the invention the instantaneous decelerometer may be constituted by a spring assisted pendulum potentiometer accelerometer, and the two electrical networks may each include resistive and capacitive elements providing time constants such that the effect is to integrate the required voltages. If the time constants are correctly chosen the non-linearity of such integrating circuits can be ignored over the initial part of the exponential characteristics. In a conventional spring-assisted pendulum potentiometer accelerometer a voltage proportional to the deceleration may be provided by a pendulum moving upon deceleration against the pressure of a spring to move a wiper across a potentiometer.

It is an advantage of the present invention that there may be included means for varying the second voltage representing the analogue initial velocity so as to provide a range of analogue initial velocities. There may also be provided means for indicating the magnitude of the said fourth voltage on a scale calibrated in relation to said second voltage to indicate directly the average deceleration applied to the apparatus during the said time interval. In such a construction in which there also are provided means for varying the said second voltage, this varying means may be coupled to the means for indicating the average deceleration in such a way that when the analogue initial velocity is changed the calibration of the indicating means is automatically adjusted to indicate directly the average deceleration applied to the apparatus.

It is also an advantage of the present invention that there can be provided a compact, light apparatus which can easily be carried from vehicle to vehicle.

It will be appreciated that while the present invention has been described as apparatus for measuring the average deceleration, and the description of embodiments of the invention is framed in terms of deceleration measurement, such apparatus is equally applicable to the measurement of average acceleration merely by reversing the position of the instantaneous decelerometer relative to the object producing the acceleration or deceleration.

Embodiments of the invention will now be described by way of example with reference to the accompanying drawings, in which:

FIGURE 4 shows a circuit of a high impedance voltmeter suitable for use in the apparatus of FIGURE 1, and FIGURES 5a and b show side and end views of a bifilar spring-assisted pendulum potentiometer accelerometer.

Figure 1:
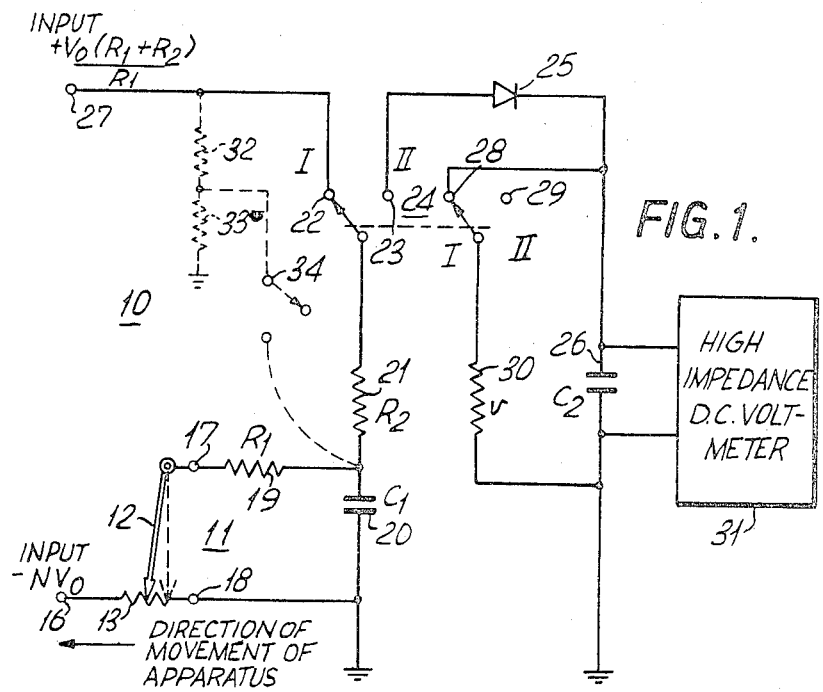
FIGURE 1 shows a general circuit diagram of apparatus embodying the invention for measuring average deceleration.

Referring firstly to FIGURES 1 and 5, a spring-assisted pendulum potentiometer accelerometer 11 consists of a pendulum arm 12 adapted to move across a potentiometer winding 13 when affected by acceleration or deceleration applied to the apparatus. The pendulum arm 12 is suspended from a bearing 14 and is restrained by a spring 15. The pendulum is arranged to move only over a relatively small arc so that the restraining force is provided by the spring 15 rather than by gravity. There is supplied to an input terminal 16 of the decelerometer an input voltage having a value $NV_0$ the significance of which will be explained hereinafter.

The output of the decelerometer 11 is fed from two output terminals 17 and 18 to a first electrical network consisting of a resistor 19 having a value $R_1$ and a capacitor 20 having a value $C_1$. One side of the capacitor 20 is connected in common with the terminal 18 to earth and the other side of the capacitor 20 is connected through the resistor 19 to the other output terminal 17.

The side of the capacitor 20 remote from earth is connected to a second electrical network consisting of a resistor 21 connected through terminal 23 of a ganged switch 24 to a diode 25 and thence to a capacitor 26. The side of the capacitor 26 remote from diode 25 is connected to earth. The ganged switch 24 has two positions marked I and II. When the switch 24 is in position II, the resistor 21 is connected directly to the diode 25 and thence to the capacitor 26. When the switch 24 is in the position I, the resistor 21 is connected through the terminal 22 to a further input terminal 27.

The ganged switch 24 also has a pair of terminals 28 and 29. A leakage resistance 30 is connected across the capacitor 26 in such a manner that when the switch 24 is in position I the leakage resistance 30 is connected across the capacitor 26 through the terminal 28, but that when the switch 24 is in the position II, the resistor 30 is connected to a free terminal 29 and is then isolated from the capacitor 26. The diode 25 is connected to allow positive current flow from the resistor 21 to the capacitor 26. A high impedance D.C. voltmeter 31 is connected across the capacitor 26.

In operation the apparatus is set up in the vehicle to be tested with the vehicle moving at a constant velocity in the direction shown and a voltage $$\frac{V_o(R_1+R_2)}{R_2}$$

applied to the terminal 27. The switch 24 is initially in the position I, so that a voltage $V_o$ is provided across the capacitor 20 to represent an analogue initial velocity. The actual initial velocity of the vehicle is arranged to be slightly higher than the analogue initial velocity represented on the capacitor 20. With the vehicle moving at a constant speed, the arm 12 of the potentiometer 11 is vertical so that the resistor 19 is connected to earth. Also at this stage the capacitor 26 is arranged to discharge through the resistor 30 and to present zero voltage to the voltmeter 31.

In operation the switch 24 is coupled to the brake pedal of the vehicle to be tested so that on application of the brakes the switch 24 is changed to the position II. As the application of the brakes begins to take effect, the arm 12 of the potentiometer 11 swings in the direction of motion of the apparatus so that a negative voltage appears across the terminal 17 and 18. As the capacitor 20 has now been isolated from the input terminal 27, the charge of the capacitor 20 begins to leak away through the resistor 19. At the same time the capacitor 20 is connected through the resistor 21 and the diode 25 across the capacitor 26 which itself has been isolated from the leakage resistance 30. As the deceleration proceeds the voltage across the capacitor 20 decreases and represents an instantaneous analogue velocity which decreases at the same rate as does the actual velocity of the vehicle. During a typical deceleration the voltage across the terminals 18 and 17 is arranged to be large compared with the initial voltage across the capacitor 20 so that the effect of the leakage through the resistor 19 is to integrate the voltage across the terminals 17 and 18. In turn the resistance $R_2$ of the resistor 21 is arranged to be large compared with the resistance $R_1$ of the resistor 19 so that the leakage from the capacitor 20 to the capacitor 26 is relatively small and the effect of the second electrical circuit containing elements 21, 25 and 26 is to integrate voltage appearing across the capacitor 20. Thus there appears across the capacitor 26 during the process of deceleration a voltage (very small compared with that across the capacitor 20) which provides an analogue of the distance travelled by the vehicle during the deceleration.

As the analogue initial velocity originally represented across the capacitor 20 is less than the actual initial velocity of the vehicle, the vehicle will come to rest very slightly after the voltage across the capacitor 20 has fallen to zero. When the voltage across the capacitor 20 reaches zero no further current flows through the diode 25 and the capacitor 26 carries a voltage representing the final analogue distance required to decelerate from the original analogue initial velocity. In conjunction with a knowledge of the initial analogue velocity it will be seen that this final analogue distance represented by the voltmeter 31 provides an indication of the over-all braking efficiency of the vehicle. It is important to realise that, as the vehicle actually comes to rest a very short time after the analogue velocity has been entirely destroyed, the braking efficiency is in fact measured over a proportion of the time during which deceleration takes place. However, it is clear that as the time interval for which the braking efficiency is measured extends from the very commencement of the depression of the brake pedal until the vehicle is virtually at rest, the possible error will be very small and will be confined to the time when the vehicle is travelling very slowly and therefore adding very little to the overall braking distance. The braking efficiency is inversely proportional to the overall braking distance which in turn (for any interval of time) is proportional to the square of the average velocity (during that time interval). Thus any error introduced into the braking efficiency measured is reduced by a square law factor by virtue of the fact that the error occurs when the vehicle is virtually at rest.

After the measurement has been made the switch 24 is returned to the position I so that the capacitor 26 can be discharged and the capacitor 20 recharged to the required voltage $V_o$. In order to facilitate the charging of the capacitor 20 a charging circuit may be included which is shown in dotted lines in FIGURE 1 and comprises resistors 32 and 33 forming a potential divider between the input terminal 27 and earth. The midpoint of resistors 32 and 33 is connected to the capacitor 20 through a switch 34 which allows the charging circuit to be switched into operation. The resistors 32 and 33 can conveniently have values of $R_2/n$ and $R_1/n$ respectively, to increase the speed of charging by a factor of $n$.

Figure 2:
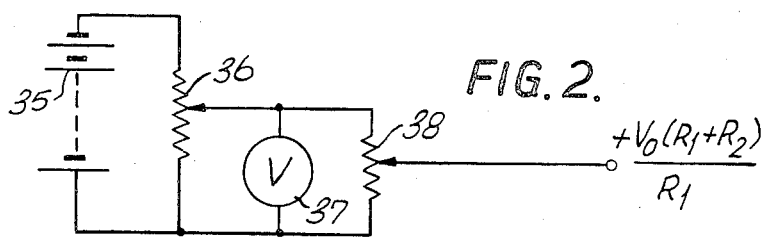
FIGURE 2 shows a circuit arranged to provide an input voltage required in the circuit of FIGURE 1.

In FIGURE 2 there is shown a convenient circuit for obtaining the voltage $$V_o \frac{(R_1+R_2)}{R_1}$$

to be fed to the terminal 27. The circuit of FIGURE 2 consists of a battery 35 coupled to a potentiometer 36 the output of which is connected to a voltmeter 37 and a further potentiometer 38 from which the output voltage required is taken.

Figure 3:
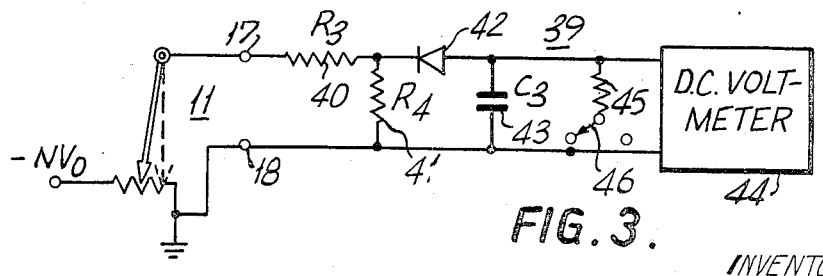
FIGURE 3 shows a modification of part of the circuit of FIGURE 1, arranged to provide a measure of the peak braking efficiency.

In FIGURE 3 there is shown a modification of FIGURE 1, which consists of a third electrical network, indicated generally by the reference numeral 39, which can be coupled to the output terminals 17 and 18 from the decelerometer 11 in place of the first electrical network having elements 19 and 20 in FIGURE 1. In FIGURE 3 a rectifying and smoothing circuit including resistors 40 and 41, a diode 42 and a capacitor 43, is arranged to feed to a voltmeter 44 a voltage representing the peak instantaneous deceleration of the vehicle being tested. A leakage resistor 45 can be switched by a switch 46 to discharge the capacitor 43.

In FIGURE 4 there is shown a conventional D.C. voltmeter including two triodes 47 and 48 coupled to a voltmeter 49. In a preferred construction of the invention the variable resistors of the charging circuit of FIGURE 2 are coupled to variable resistors in the D.C. voltmeter of FIGURE 4, so that when the initial analogue velocity applied to the capacitor 20 in FIGURE 1 is varied throughout the range provided, the calibration of the voltmeter 31 is automatically adjusted so that the indicating dial of the voltmeter 31 indicates directly the braking efficiency of the apparatus being tested.

It will be appreciated that during the deceleration a small reduction in the analogue velocity represented by the voltage across the capacitor 20 occurs due to that leakage from the capacitor through the resistor 19 to earth which would occur even if the arm 12 of the pendulum were vertical. This error is a constant factor which is equivalent to testing the vehicle on a slight incline and this factor can be taken into consideration when calibrating the voltmeter 31. Another slight loss of charge from the capacitor 20 occurs through the resistor 21 to the capacitor 26. However this is a second order of magnitude leak and the values of the various circuit components are arranged to be such that only sufficient current passes to the capacitor 26 to allow measurement of the voltage across this capacitor. It is arranged that this leakage is negligible compared with the main reduction of voltage across the capacitor 20 due to the application of the negative voltage appearing across the terminals 17, 18.

The various criteria for linearity and charge relationships may be illustrated in a practical example which will now be discussed. It is a requirement that the final recorded voltage across the capacitor 26 shall be low compared with the voltage initially across the capacitor 20.

Suppose $V_{C_2}$ max.$=0.2$ volt is the lowest feasible full scale deflection of the meter 31 for a practical instrument.

$V_{C_1} = V_o$ at $t=0$, where $t$ is time, and we require that $C_2$ shall charge up to a (negligibly) small proportion of $V_o$ in the time of a typical deceleration case.

For example a typical deceleration is $\Xi = 0.15$ g (average deceleration), which is 4.8 ft./sec.$^2$.

Therefore from a typical velocity of 22 ft./sec. a vehicle takes 4.6 seconds to stop.

In such a case it is required that $V_{C_1}$ drops to zero from $V_o$ in less than 4.6 seconds. The average voltage is approximately ½ $V_o$. The charge passing into $C_2$ is therefore $Q_2$ where $$Q_2 = \frac{1/2 V_o \cdot (4.6)}{R_2} = C_2 V_{C_2} = 0.2 C_2$$

$$= C_2 V_{C_2} = 0.2 C_2$$

Therefore $$C_2 R_2 = \frac{4.6 V_o}{2 \times 0.2}$$

$V_o$ must be much greater than 0.2 volts, so for example $V_o$ can be chosen as equal to 2.0 volts.

With such a choice, $$C_2 R_2 = \frac{4.6 \times 5}{0.4} = \frac{230}{4} = 58 \text{ seconds.}$$

Now we can calculate $C_1$ and $R_1$ from the consideration that $-NV_o$ is the full scale figure of the decelerometer 11. Allowing for overswing above 1 g. $NV_o$ can be chosen to equal 1.5 g. Thus for the said typical deceleration of 0.15 g., or 15% brake efficiency, the output of the decelerometer is $$-\frac{0.15 \, gNV_o}{1.5 \, g}$$

which equals $$-\frac{NV_o}{10}$$

volts. This must reduce the voltage $+V_o = +2$ volts to zero in 4.6 seconds, and for reasons of linearity $$\frac{NV_o}{10} \gg V_o$$

(this is the lower end of the $g$ range therefore linearity is not mandatory).

So for example $$\frac{NV_o}{10} = 10 V_o$$

can be chosen as $=20$ volts

Thus $N=100$, and $NV_o = 200$ volts

For the case of 15% brake efficiency the current flow to the capacitor 20 is $$\frac{21 \text{ volts}}{R'}$$

Charge $Q_1 = \frac{21}{R'} \cdot 4.6 = C_1 \cdot V_o = 2 C_1$ $$\therefore C_1 R_1 = 48$$

Thus the value of $C_1$ and $R_1$ can be chosen from this criterion.

A further consideration is that the process of charging $C_2$ to 0.2 volt shall not take an appreciably large charge from $C_1$ in terms of $Q_o = C_1 V_o$.

That is to say $C_1 V_o \gg C_2 V_2$ max.

Say $C_1 V_o \gg 10 C_2 V_2$ $$2 C_1 \gg 10(0.2) \quad C_2 \gg 2 C_2$$

That is to say $C_1 \gg C_2$

If for example, $C_1 = 4 C_2$, values for $R_1$ and $R_2$ can be determined. $R_2$ will be the greater and 20MΩ is suitable. If $R_2 = 20 M\Omega$
then $C_2 = 2.9 \, \mu f.$
$R_1 = 4.15 M\Omega$
$C_1 = 11.6 \, \mu f.$ It is not necessary in a practical instrument for values to be selected for these parameters. All that need be done is to obtain nearest values in stable circuit components and set the voltage values to accord with exact calibration. This may best be done by a circuit as shown in FIGURE 2. This circuit includes the analogue velocity selector 36 and the tap down compensator 38 drawing a small enough current not to upset the main selection. The analogue velocity set can be read by the separate small meter 37 or the selector can be a precision resistor network.

In FIGURE 3, the values of $R_3$ and $C_3$ should be chosen to ignore transients of very short duration caused by vehicle vibration or a degree of under damping of the accelerometer. Suitable values are $C_3=1\mu f$. $R_4=0.25M\Omega$ giving a time constant $CR=0.25$ seconds.

The voltage is reduced by 20:1 with these values.

The output impedance of the accelerometer need only be small compared with megohms so that any suitable value from $1000\Omega$ to $100K\Omega$ would be satisfactory.

It will readily be appreciated that apparatus of this kind can be used as a multi-range device merely by electrical switching of potential dividers or capacitor values, to change the analogue velocity $V_o$ and correspondingly the distance stopping scale.

A suitable valve circuit for the high impedance voltmeter is shown in FIGURE 4; transistor circuits are also feasible.

Air damping is probably the best form of response control for this particular application.

I claim:

1. Apparatus for measuring average deceleration, said apparatus comprising:
   an electrical instantaneous decelerometer, said decelerometer operating to provide a first voltage representing instantaneous deceleration applied to said apparatus;
   a first electrical network, said network operating to integrate said first voltage and to subtract the resultant from a second voltage representing an analogue of the actual initial velocity of said apparatus, said first electrical network operating to provide a third voltage representing an analogue instantaneous velocity which is an analogue of the actual instantaneous velocity of said apparatus; and
   a second electrical network, said second electrical network operating to integrate said third voltage over the time interval for which the average deceleration to be measured to provide a fourth voltage representing an analogue distance which is an analogue of the actual distance travelled by said apparatus during said time interval and which analogue distance provides a measure of the average deceleraation, and said second electrical network including diode means for preventing further deceleration forces from interfering with said fourth voltage after said third voltage has decayed.

2. Apparatus according to claim 1 including means for varying said second voltage to provide a range of analogue initial velocities.

3. Apparatus according to claim 1, in which said second electrical network includes a normally open switch means with said switch means being moved to a closed position so as to close said second electrical network when a deceleration force is applied to said apparatus.

4. Apparatus according to claim 1 in which the said instantaneous decelerometer is constituted by a spring-assisted pendulum potentiometer accelerometer.

5. Apparatus according to claim 1 in which:
   said first electrical network consists of a first capacitive element, said first capacitive element being connected from a first terminal thereof to a point of fixed potential, and a first resistive element, said first capacitive element being connected from a second terminal thereof through said first resistive element to the output of said instantaneous decelerometer, said apparatus including charging means for charging said first capacitive element to said second voltage at the commencement of use of said apparatus, the polarity of the output of said instantaneous decelerometer and the time constant of said first electrical network being such that the effect of said first resistive and capacitive elements is to integrate said first voltage and to provide across said first capacitive element said third voltage.

6. Apparatus according to claim 5 in which:
   said second electrical network comprises a second capacitive element, said second capacitive element being connected from a first terminal thereof to a point of fixed potential, and a second resistive element, said second resistive element being connected from a second terminal thereof through said second resistive element to said output of said first electrical network, the time constant of said electrical network being such that said third voltage is integrated to provide said fourth voltage across said second capacitive element.

7. Apparatus according to claim 1 in which:
   said second electrical network comprises a second capacitive element, said second capacitive element being connected from a first terminal thereof to a point of fixed potential, and a second resistive element, said second resistive element being connected from a second terminal thereof through said second resistive element to said output of said first electrical network, the time constant of said electrical network being such that said third voltage is integrated to provide said fourth voltage across said second capacitive element.

8. Apparatus according to claim 1 including a third electrical network adapted to be connected to the output of the instantaneous decelerometer in place of the said first electrical network and being arranged to provide an indication of the peak instantaneous deceleration applied to the apparatus.

9. Apparatus for measuring average deceleration, said apparatus comprising:
   an electrical instantaneous decelerometer, said decelerometer operating to provide a first voltage representing instantaneous deceleration applied to said apparatus;
   a first electrical network operating to integrate said first voltage and to subtract the resultant from a second voltage representing an analogue initial velocity which is an analogue of the actual initial velocity of said apparatus, said first electrical network operating to provide a third voltage representing an analogue instantaneous velocity which is an analogue of the actual instantaneous velocity of said apparatus;
   a second electrical network operating to integrate said third voltage over the time interval for which the average deceleration is to be measured to provide a fourth voltage representing an analogue distance which is an analogue of the actual distance travelled by said apparatus during said time interval and which analogue distance provides a measure of the average deceleration; and
   means for indicating the magnitude of said fourth voltage on a scale calibrated in relation to said second voltage to indicate directly the average deceleration applied to said apparatus during said time interval.

10. An apparatus according to claim 9, further including means for varying said second voltage to provide a range of analogue initial velocities, and in which the said indicating means includes a variable calibration device coupled to the said means for varying the second voltage in such a manner that selection of an analogue initial voltage represented by the second voltage automatically provides for calibration of the said indicating means to indicate directly the average deceleration applied to the apparatus during the said time interval.

11. Apparatus according to claim 9, further including a third network adapted to be connected to the output of the instantaneous decelerometer in place of the first electrical network and being arranged to provide a fifth voltage representing a peak instantaneous deceleration, and including a switch for isolating the said indicating means from the second electrical network and connecting the indicating means to the output of the third electrical network to provide an indication of the peak instantaneous deceleration.

References Cited

UNITED STATES PATENTS 2,839,922  6/1958  Manildi _____ 73—517 XR
3,158,028  11/1964  Chope _____ 73—490

JAMES J. GILL, Primary Examiner

U.S. Cl. X.R.

73—121